July 2, 1929.　　　G. L. BENFORD　　　1,719,387
AUXILIARY TENSIONING ELEMENT FOR AUTOMOBILE SPRINGS
Filed Jan. 29, 1927
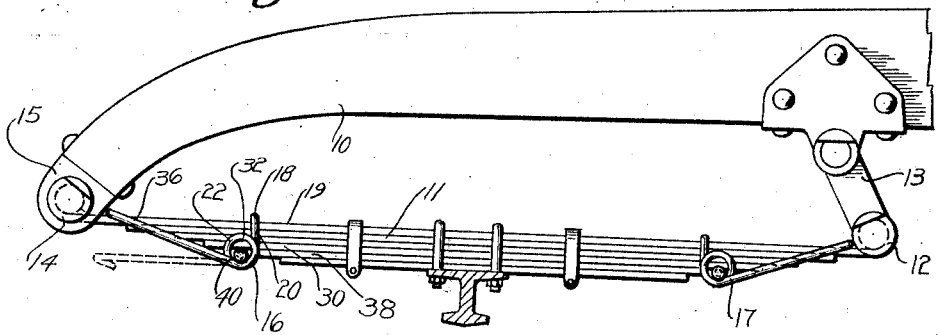
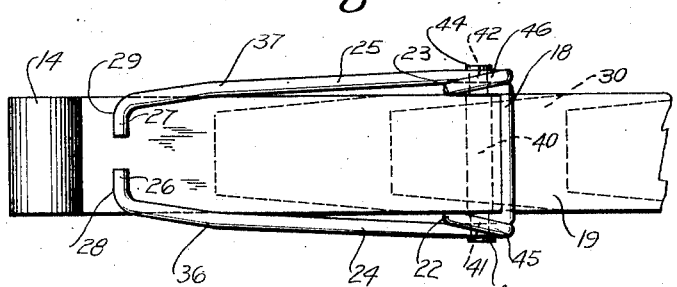
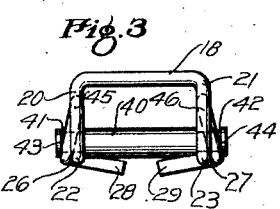
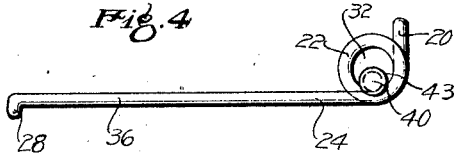
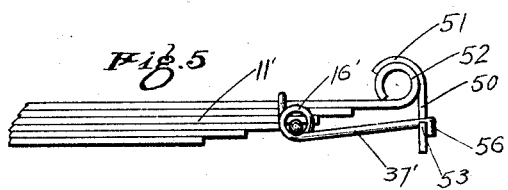
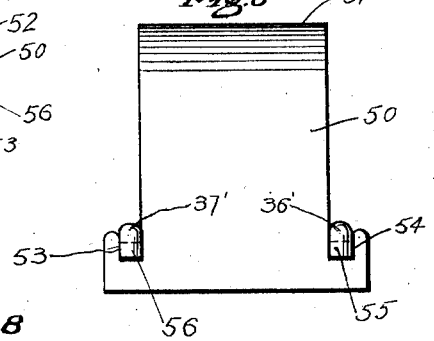
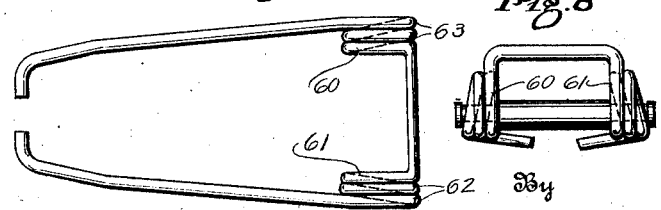
Inventor
George Louis Benford
By Frank L. Slough
His Attorney Patented July 2, 1929.

1,719,387

UNITED STATES PATENT OFFICE.

GEORGE LOUIS BENFORD, OF SPENCER, OHIO.

AUXILIARY TENSIONING ELEMENT FOR AUTOMOBILE SPRINGS.

Application filed January 29, 1927. Serial No. 164,420.

My invention relates to an improved auxiliary tensioning element for automobile body supporting semi-elliptic leaf springs.

One of the objects of my invention is to provide an improved auxiliary tensioning element which may be quickly attached to a leaf spring, readily removed therefrom, and which will not become accidentally disengaged therefrom.

Another object of my invention is to provide an improved leaf spring tensioning element which, when applied thereto, will be self-sustaining on the spring, thereby eliminating the use of bolts and the like to retain it in place on the spring.

Another object of my invention is to provide an improved tensioning element which may be attached to a standard elliptic or semi-elliptic leaf spring and carried solely thereby without altering the spring structure.

Another object of my invention is to provide an improved tensioning element for leaf springs which is capable of absorbing the tendency of a leaf spring to deflect rapidly creating shocks during the downward deflection thereof by reason of the running gear striking obstructions in the path of travel of the vehicle, and which will effectively check the rebound thereof.

Another object of my invention resides in the provision of an improved tensioning element for springs which is simple in construction, positive in operation, and which may be economically manufactured in large quantities.

These and other objects of my invention and the invention itself will become apparent from reference to the following description of an embodiment thereof and in which embodiment reference will be had to the accompanying drawings forming a part of this specification.

Referring to the drawings:

Fig. 1 is a side elevational view of a semi-elliptic leaf spring embodying my invention and illustrating in dotted lines one of the positions of the same when applying the embodiment to the end of a spring;

Fig. 2 is a fragmentary top plan view of a spring embodying my invention, attached to but one end of the spring;

Fig. 3 is an end elevational view thereof removed from the spring;

Fig. 4 is a side elevational view of the foregoing embodiment removed from the spring;

Figs. 5 and 6 are side and end elevational views, respectively, of another embodiment of my invention;

Figs. 7 and 8 are side and end elevational views, respectively of still another embodiment thereof; and Fig. 9 is a view, in elevation, of a modified roller element.

Referring particularly to Figs. 1 to 4, inclusive, wherein like reference characters designate like parts, at 10, I show a longitudinally extending side frame of an automotive vehicle chassis, at 11, a semi-elliptic leaf spring, having a shackle bolt receiving eye portion 12 adjacent the shackle 13 and a bolt receiving eye portion 14 adapted to receive a bolt in a bracket 15 depending from the forward end of the frame 10, and at 16 and 17 I show a pair of auxiliary tensioning elements, which I employ in carrying out my invention, one attached to each end of the spring adjacent the shackle 13 and the bracket 14. I contemplate employing a pair of tensioning elements 16 and 17 on each spring of the vehicle. However, it is to be understood that I may sometimes employ but one of the elements on the spring.

The auxiliary tensioning elements preferably comprise a single piece of heavy resilient spring tempered wire having a central portion 18 disposed transversely of the spring and engaging the topmost leaf 19 thereof. The central portion is bent downwardly at each side to provide a pair of depending arms 20 and 21 disposed along the sides of the spring. Said central portion and said arms are adapted to form a U-shaped clip disposed about three sides of the spring. Arms 20 and 21 are coiled at 22 and 23 to provide loops 45 and 46 therein and the free ends of the loops, when not applied to the spring, extend at right angles to the arms 20 and 21 and provide a pair of longitudinally extending spring arms 24 and 25 substantially parallel with the spring leaves. Said arms are slightly bent towards each other at 36 and 37 and are provided with inturned ends 26 and 27 adapted to be snapped over the edges of the leaves adjacent the shackle and bracket portions thereof when the device is applied to the spring. Said inturned ends may be bent downwardly at 28 and 29 to secure better frictional contact thereof with the topmost leaf 19 of the spring.

Spring tensioning elements 16 and 17 are preferably secured in place on the spring adjacent each end thereof by virtue of a retaining and clamping member 40 preferably of cylindrical form and transversely disposed in resilient anti-frictional contact with the under side of a leaf 30 of the spring. Peripheral grooves 41 and 42 are formed in the ends of the roller and form annular end flanges 43 and 44. The diameter of said roller is less than the diameter of the inner peripheries 31 and 32 of the loops 45 and 46 and so that the roller may be placed in the loops with the grooves riding on the looped portions of the coils and thereby preventing lateral displacement of the roller by virtue of the annular flanges overlapping the said loops and abutting against the coils.

In applying my improved tensioning element to a spring the U-shaped clip portion thereof is first placed over the topmost leaf of the spring at a point where it is of a thickness of several leaves and the arms 24 and 25 are spread apart and placed over the spring, and the roller 40 is placed within the loop openings 31 and 32, said openings being aligned below the spring leaf 30 on each side of the spring.

A pair of such tensioning elements being employed on each spring, one adjacent each end of the spring. The roller is then inserted into the opening of the coils and bears upon and may roll on the leaf 30 by virtue of the resiliency of the coils and contour of the roller. In this position there is but a slight tension on the roller and arm 16 and the horizontally extended arms 34 and 35 are in the position shown in the dotted lines in Fig. 1. The arms 24 and 25 are then bent upwardly against the spring pressure exerted by the coils 45 and 46 and are hooked over the topmost leaf 19 of the spring at a point where the spring is of but a single leaf thickness, adjacent the shackle and bracket.

The attachment will prevent free downward deflection of the spring and will check the rebound of the spring returned to the normal unstressed position, thereby absorbing shocks usually communicated to the automobile body by the springs not equipped with my invention.

The shackle bolt receiving portion will prevent the tensioning element from disengaging the end of the spring while the roller will engage the end of the leaf 38 and prevent it from moving in a direction, on the spring, away from the shackle or bracket.

Referring to Figs. 5 and 6 of the drawing, I show another embodiment of my invention wherein I provide a plate 50 having a hook shaped end 51 adapted to be placed over the top of the shackle bolt housing 52 of the spring 11. The lower end of the plate is provided with a pair of hooked portions 53 and 54 over which the ends of the spring arms 36 and 37 of the element 16' are snapped. The ends of the arms are bent downwardly at 55 and 56 to prevent longitudinal movement of the tensioning element along the spring.

The mounting plate 50 is particularly adaptable to heavy springs where I employ a tensioning element formed of a heavier wire than the wire from which the element of the embodiment of Fig. 1 is made, thereby permitting the same to be more readily placed on the spring. The plate also permits the element to be applied to springs of varying constructions and leaf thicknesses.

Referring to Figs. 7 and 8, I show still another embodiment of my invention wherein I sometimes contemplate forming the auxiliary tensioning element with a pair of coils 60 and 61, each having double loops 62 and 63. A device formed in this manner will decrease the tension of the same and will be more adaptable for use on cars of the lighter class than the foregoing embodiments employing coils of but a single loop. Resiliency of the device will be increased by forming coils having more than one loop and I may sometimes contemplate forming the same with more than two loops.

Referring to Fig. 9 of the drawings, I have illustrated a roller element 40' which may be employed in place of the roller 40. The ends of this roller are upset at 70 and 71 to provide annular flanges thereon adapted to overhang the coils 22 and 23 of the clip and prevent relative lateral movement thereon. I find a roller constructed in this manner more economical to manufacture than the roller 40 employing the annular grooves 41 and 42.

It will be readily seen that an auxiliary spring tensioning device constructed in the manner set forth in the foregoing and applied to a leaf spring will effectively check the rebound of the spring as well as absorb the shock of the spring in deflecting downwardly due to striking obstacles in the path of its travel. I have found that employing one of my auxiliary tensioning elements to each spring in accomplishing the above results is satisfactory. However, sometimes I may employ one of my auxiliary tensioning elements at each end of the leaf spring. In either case the same may be applied to a spring readily without altering the spring and only in instances where I employ my device manufactured from heavy wire will it be necessary to use tools in order to attach the same to the spring and remove the same.

All the embodiments are adapted to be attached to a leaf spring without the aid of tools and will not become readily disengaged therefrom by virtue of the resiliency of the element. Squeaking and undue friction between the spring leaves and the element is nil due to the rolling contact of the roller which clamps the same on the spring.

Having thus described my invention in certain specific embodiments I am aware that numerous and extensive departures may be made from the embodiments herein illustrated and described but without departing from the spirit of my invention.

I claim:

1. An auxiliary tensioning device for leaf springs and solely carried thereon, comprising a single piece of spring tempered metallic wire bent to form a clip, said clip having a cross arm engaging the top leaf of the spring, a pair of coils joined to each other by the cross arm, a pair of longitudinally extending arms extending from the coils, and hooked over the topmost leaf of the spring, and clamping means to clamp the device onto the spring.

2. In a device of the class described, the combination with an automobile chassis frame, a leaf spring, suspension means for said spring, and a resilient spring tensioning element having a portion disposed over the leaves of the spring, a pair of looped portions, a pair of resilient arms extending longitudinal of the spring, said arms having inturned ends adapted to be snapped over the topmost leaf of the spring, and a transverse rod, said rod having the ends thereof projected between the loops and having an intermediate portion engaging the underside of one of the spring leaves.

3. In an auxiliarily tensioning device for leaf springs comprising a single piece resilient metallic clip, said clip having a transversely disposed arm adapted to engage the top leaf of the spring, a pair of loops joined together by the transverse arm, a pair of longitudinally extending arms extending from the loops, said longitudinal arms having hooked ends disposed over a top leaf, and means for clamping the clip onto the spring.

4. In a snubber for the flat composite spring of an automobile, a wire loop having its sides bent at similar angles and provided with integral coils in said angles, the looped end of said snubber being engaged with the upper face of said composite spring, a bolt passing through said coils and engaged with the lower face of said composite spring, the free extremities of said snubber being extended laterally over and engaged with the upper side of said composite spring.

5. In a snubber for the flat composite spring of an automobile, a wire loop having its sides bent at corresponding angles, the looped end of said snubber being engaged with the upper face of said composite spring, and a bolt interposed between the lower face of said composite spring and the bent loop sides, when extended transversely thereof, the free extremities of said snubber being extended laterally and adapted to be sprung over and engaged with the upper side of said composite spring, against the power of the inherent resiliency of the distorted spring.

6. A snubber for the flat composite spring of an automobile comprising a pair of parallel spring wire side elements, means joining the elements at a corresponding end of each, said elements bent at similar angles and provided with integral coils in said angles, said joining means being engaged with the upper face of said composite spring, a bolt passing through said coils and engaged with the lower face of said composite spring the free extremities of said snubber being extended laterally over and engaged with the upper side of said composite spring.

7. A snubber for the flat composite spring of an automobile comprising a pair of parallel spring wire side elements, means joining the elements at a corresponding end of each, said elements bent at corresponding angles, said joining means being engaged with the upper face of said composite spring, and a bolt interposed between the lower face of said composite spring and the bent loop sides, when extended transversely thereof, the free extremities of said snubber being extended laterally and adapted to be sprung over and engaged with the upper side of said composite spring, against the power of the inherent resiliency of the distorted spring.

8. A spring snubber for vehicle springs comprising a single piece of wire bent in the form of a loop having parallel side arms, each arm coiled into the form of a helix intermediate its ends and terminating in outstretched arms extending tangentially, each at an obtuse angle to the other, from the helix, and means adapted to communicate pressure from the helices against the underside of the vehicle spring, said jaws adapted to be forced over and into engagement with the upper surfaces of the spring.

9. In a snubber for the flat composite spring of an automobile, a wire loop having its sides bent at similar angles and provided with integral coils in said angles, the looped end of said snubber being engaged with the upper face of said composite spring, a bolt passing through said coils and engaged with the lower face of said composite spring, said bolt being of less diameter than the inside diameter of the coils so as to permit free contraction thereof, the free extremities of said snubber being extended laterally over and engaged with the upper side of said composite spring.

10. In a snubber for the flat composite spring of an automobile, a wire loop having its sides bent at similar angles and provided with integral coils in said angles, the looped end of said snubber being engaged with the upper face of said composite spring, a bolt passing through said coils and engaged with the lower face of said composite spring, the free extremities of said snubber adapted to effect downward spring pressure on a longitudinally remote portion of the spring from the portion of engagement of said bolt therewith.

11. In a snubber for the flat composite spring of an automobile, a wire loop having its sides bent at similar angles and provided with integral coils in said angles, the looped end of said snubber being engaged with the upper face of said composite spring, a bolt passing through said coils and engaged with the lower face of said composite spring, and means to transmit downwardly directed pressure from the free extremities of the snubber to the upper side of said composite spring.

12. In a snubber for the flat composite spring of an automobile, a wire loop having its sides bent at similar angles and provided with integral coils in said angles, the looped end of said snubber being engaged with the upper face of said composite spring, means passing through said coils and engaged with the lower face of said composite spring, and means to transmit downwardly directed pressure from the free extremities of the snubber to the upper side of said composite spring.

In testimony whereof I hereunto affix my signature this 1st day of December, 1926.

GEORGE LOUIS BENFORD.